US008647093B2

(12) United States Patent
Stockhaus

(10) Patent No.: US 8,647,093 B2
(45) Date of Patent: Feb. 11, 2014

(54) DEVICE AND A METHOD FOR COMPRESSION MOULDING OF A FIBRE TRAY

(75) Inventor: Joakim Stockhaus, Sollentuna (SE)

(73) Assignee: SIG Technology AG, Neuhausen (CH)

( * ) Notice: Subject to any disclaimer, the term of this patent is extended or adjusted under 35 U.S.C. 154(b) by 581 days.

(21) Appl. No.: 12/918,207

(22) PCT Filed: Feb. 20, 2009

(86) PCT No.: PCT/SE2009/050189
§ 371 (c)(1),
(2), (4) Date: Aug. 18, 2010

(87) PCT Pub. No.: WO2009/105027
PCT Pub. Date: Aug. 27, 2009

(65) Prior Publication Data
US 2010/0330312 A1 Dec. 30, 2010

(30) Foreign Application Priority Data
Feb. 20, 2008 (SE) .................................. 0800387-3

(51) Int. Cl.
*D21J 5/00* (2006.01)
*D21J 7/00* (2006.01)
(52) U.S. Cl.
USPC ............. 425/85; 425/388; 425/407; 425/415; 425/423; 162/382; 162/388; 162/226; 162/230
(58) Field of Classification Search
USPC ............. 425/84, 85, 388, 407, 412, 415, 423; 162/382, 226, 228, 230; 249/102, 141
See application file for complete search history.

(56) References Cited

U.S. PATENT DOCUMENTS

| 2,923,068 | A | | 2/1960 | Wells | |
|---|---|---|---|---|---|
| 3,602,287 | A | * | 8/1971 | Eversdyk | 425/86 |
| 5,431,784 | A | * | 7/1995 | Miyamoto et al. | 425/84 |
| 6,048,440 | A | * | 4/2000 | Baker | 425/85 |

(Continued)

FOREIGN PATENT DOCUMENTS

| WO | 2006057609 | 6/2006 |
|---|---|---|
| WO | 2007111567 | 10/2007 |

OTHER PUBLICATIONS

International Search Report issued in the International Application on May 28, 2009.

*Primary Examiner* — Richard Crispino
*Assistant Examiner* — Thukhanh Nguyen
(74) *Attorney, Agent, or Firm* — Young & Thompson

(57) ABSTRACT

A device for manufacturing a tray of cellulose material, includes:
a compression mold including an essentially flat bottom end and surrounding sides for compression molding and drying of cellulose pulp to a finished tray;
a male mold arranged to fit into the compression mold and that includes a bottom space and lateral surfaces corresponding to the compression mold, wherein the compression mold and the male mold between themselves delimit a mold space including a base section and a side section for compression molding of the cellulose pulp. Both the compression mold and the male mold are provided with blow and suction devices for blowing in and suction of fluid in and out of the mold space. The blow and suction devices include an inlet pipe having an inlet valve, coupled to an inlet chamber in connection with the mold space, and an outlet pipe having an outlet valve separated from the inlet pipe and coupled to an outlet chamber in connection with the mold space.

10 Claims, 3 Drawing Sheets

(56) References Cited

U.S. PATENT DOCUMENTS

| | | | |
|---|---|---|---|
| 6,582,562 B2 * | 6/2003 | Gale et al. | 425/423 |
| 6,769,893 B2 * | 8/2004 | Austin et al. | 425/110 |
| 7,306,834 B2 * | 12/2007 | Nonomura et al. | 428/34.2 |
| 7,909,964 B2 * | 3/2011 | Nilsson et al. | 162/226 |
| 2001/0035275 A1 | 11/2001 | Gale et al. | |

* cited by examiner

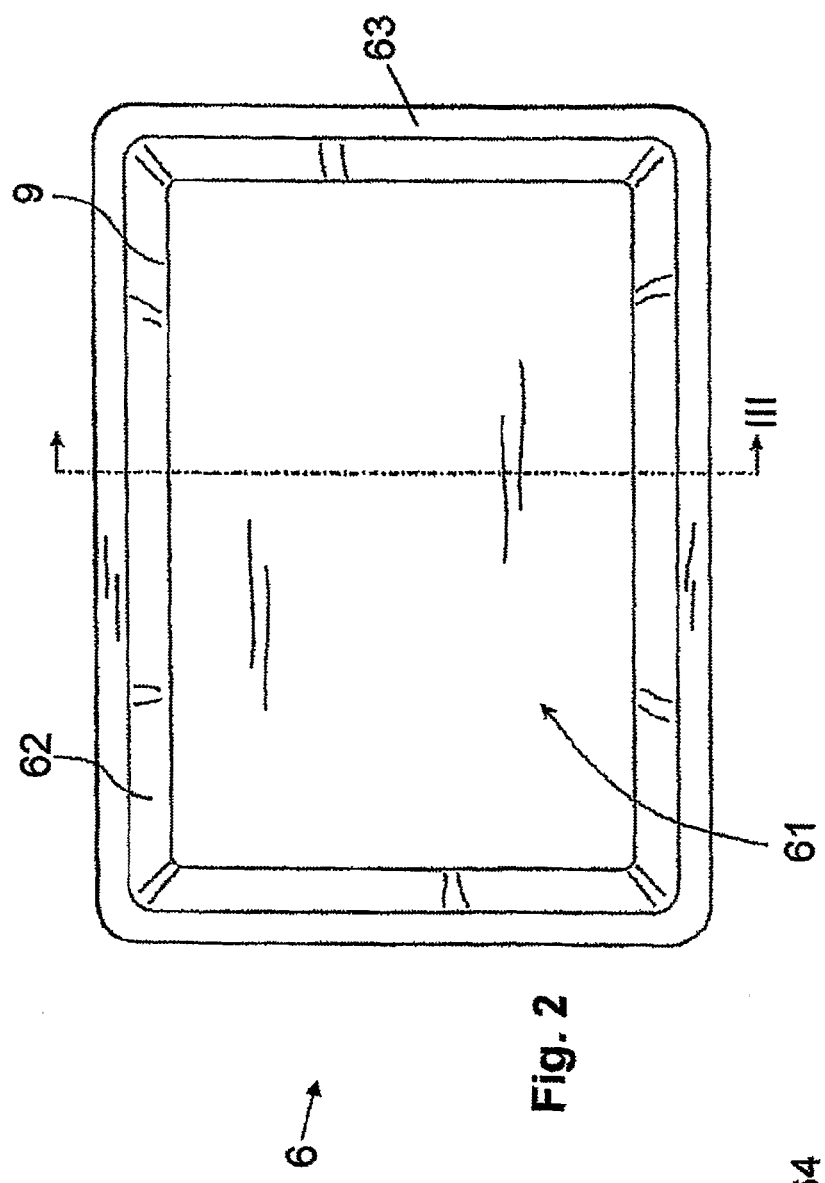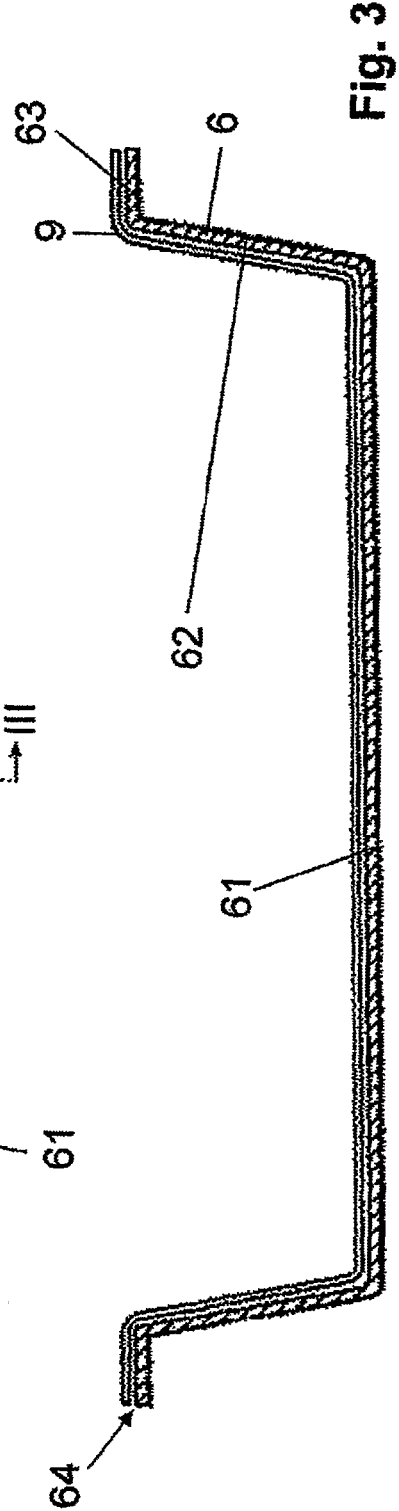

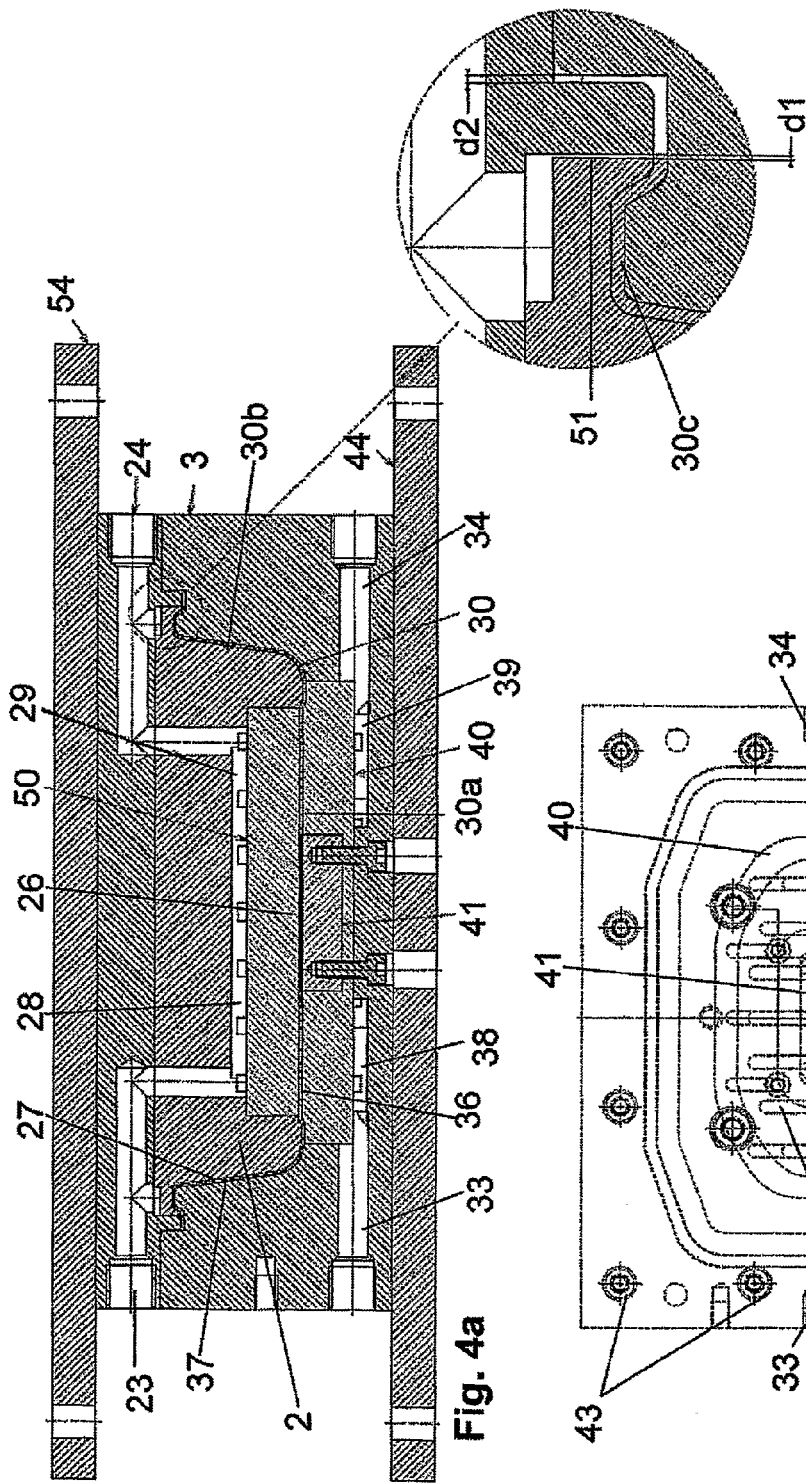

DEVICE AND A METHOD FOR COMPRESSION MOULDING OF A FIBRE TRAY

TECHNICAL FIELD

The present invention relates to a device and a method for compression moulding of a fibre tray, in particular a fibre tray of cellulose. The invention also relates to a tray that has been manufactured by said device, which tray is intended for storage of food.

BACKGROUND

The handling of food makes great demands on the packages in which the food is stored. They must fulfil sanitary requirements, i.e. bacteria and flavourings shall not be capable of migrating through the package to and from the surroundings. They must have enough strength for the handling at storage and transport. Strict environmental requirements are also put on the packages, e.g. concerning the recycling, composting or combustion of used packages.

Ready-cooked food is becoming increasingly common and besides functioning as a package for storing of the product, demands are made for a direct placement of the packages in microwave ovens and conventional ovens for the preparation of food dishes. Packages in the form of aluminium ware are now being used to a high extent. They withstand conventional ovens but a disadvantage is that they become very hot. Aluminium ware is also fragile and does not withstand high loads. Furthermore, it should not be placed in microwave ovens. Another common type of package is trays of foamed polyester. An essential disadvantage of foamed polyester is that they cannot be placed in a conventional oven since they may melt.

PRIOR ART

Lately, it has become possible to manufacture moulded cellulose trays. In the Swedish patent application 0600702-5, a tray is described that has been manufactured by compression moulding of a suspension of fibre material of cellulose. However, the device for the manufacture of the trays that is described in said application leaves room for certain improvements. It was not unusual for the manufactured trays to have imperfections or the like, due to remainders of suspension getting stuck on the trays. Another problem was that the thickness of the trays could become slightly uneven.

The invention constitutes a further development of the method of manufacture and the device that are described in the above mentioned application.

SUMMARY OF THE INVENTION

The main object of the present invention is to solve the problems of previously known devices and methods for manufacturing trays of cellulose material. In particular, the invention relates to a device and a method by which a great number of trays may be manufactured per unit of time with improved quality.

According to a first aspect, the invention relates to a device for the manufacture of trays of cellulose material, which comprises: a compression mould comprising an essentially flat bottom end and surrounding sides for compression moulding and drying of cellulose pulp to a finished tray, a male mould that is arranged to fit into the compression mould and that comprises a bottom space and lateral surfaces corresponding to the compression mould, wherein the compression mould and the male mould between themselves delimit a mould space comprising a base section and a side section for compression moulding of the cellulose pulp, and wherein both the compression mould and the male mould are provided with blow and suction devices for blowing in and suction of fluid in and out of the mould space. The blow and suction devices of both the compression mould and of the male mould comprise an inlet pipe having an inlet valve, which is coupled to an inlet chamber in connection with the mould space, and an outlet pipe having an outlet valve, which is separated from the inlet pipe and coupled to an outlet chamber in connection with the mould space, whereby fluid that is free from impurities is arranged to be lead into the mould via the inlet pipe and the inlet chamber, and whereby fluid from the mould space is arranged to be lead away via the outlet chamber and the outlet pipe without contaminating the inlet pipe.

According to a second aspect, the invention relates to a method for the manufacture of trays of cellulose material. The method comprises the steps of:
a) adding a suspension of fibre material of cellulose to a suspension mould;
b) pressing a male mould against the suspension mould such that a suspension space is formed between them in which the suspension is enclosed;
c) adding heat to the suspension space for heating up the suspension;
d) draining off water and water vapour from the suspension in the suspension space until the suspension has been dried to a continuous paste;
e) transferring the continuous paste to a compression mould by adhering it to the male mould through suction at the same time as fluid, preferably air, is being blown from the suspension mould;
f) enclosing the continuous paste in a mould space that is formed between the compression mould and the male mould;
g) adding heat to the mould space for heating up the continuous paste;
h) draining off water vapour from the mould space until a tray having a desired dry matter content has been obtained;
i) transferring the obtained tray from the compression mould by adhering it to the male mould through suction at the same time as fluid, preferably air, is being blown from the compression mould, wherein the compression mould is provided with separate inlet and outlet pipes such that fluid that is free from impurities is lead into the mould space via the inlet pipe, and whereby fluid from the mould space is lead away via the outlet pipe without contaminating the inlet pipe.

The invention according to the above given aspects solves the problems of the device and the methods according to the prior art. With the first and second aspects of the invention it is possible to manufacture trays of improved quality. These advantages and other aspects of the invention will be evident from the detailed description and the enclosed drawings.

SHORT DESCRIPTION OF THE DRAWINGS

In the detailed description of the present invention, reference will be made to the enclosed drawings, of which:

FIG. 2 shows a view from above of a tray that has been manufactured according to the method of manufacture according to the invention;

FIG. 3 shows a cross-section of the tray in FIG. 2 along the cut III;

FIG. 4a shows a compression mould and a male mould that constitute a part of the device according to the invention;

FIG. 4b shows an enlarged detail from FIG. 4a;

FIG. 5 shows the compression mould of FIG. 4a in cross-section.

DETAILED DESCRIPTION OF THE EMBODIMENTS SHOWN OF THE INVENTION

Figure 1:
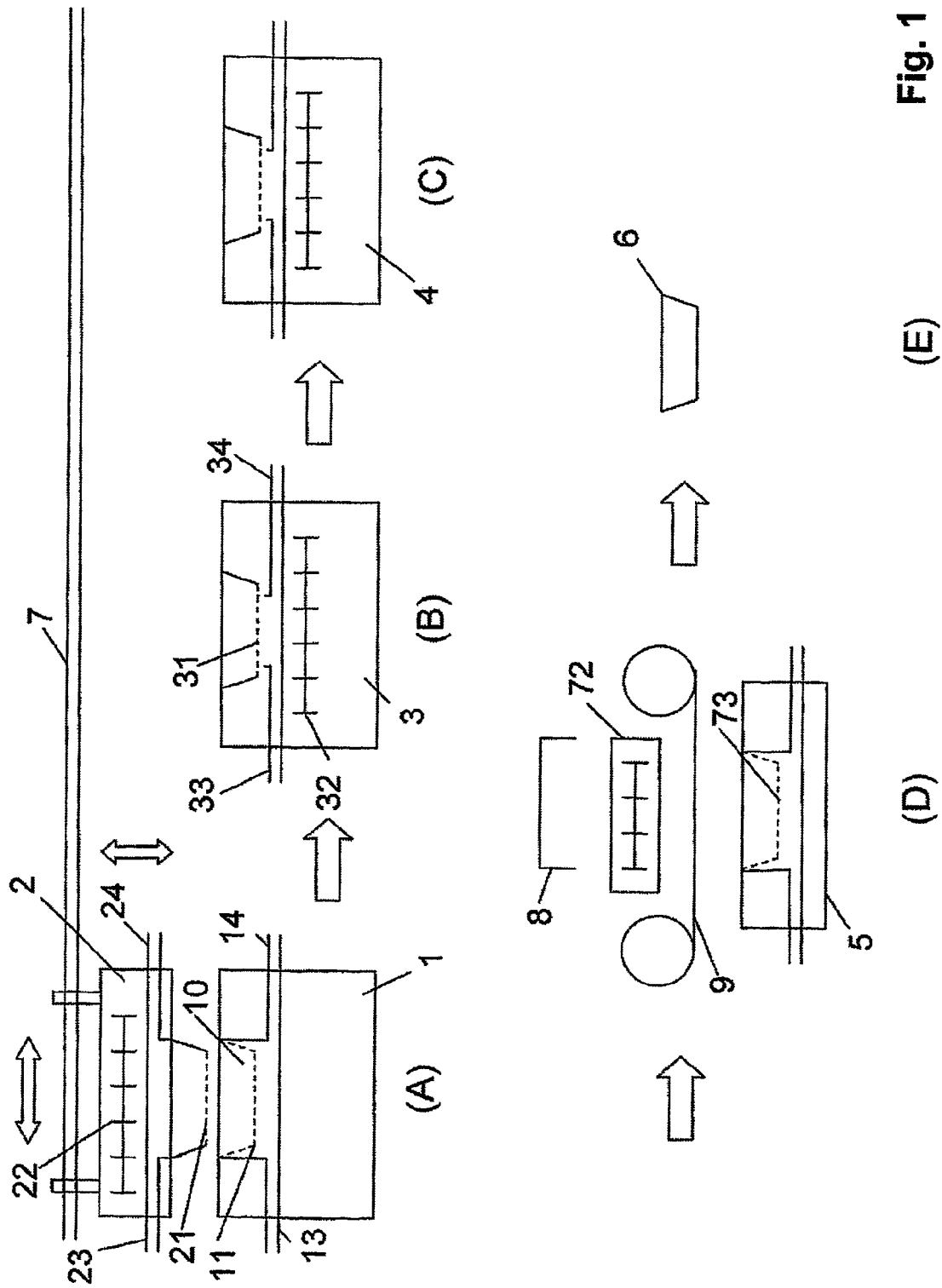
FIG. 1 shows a schematic view of different steps of the method of manufacture according to the invention.

FIG. 1 shows a schematic view of the method of manufacture according to the invention, which relates to the manufacture of trays of cellulose material. The method comprises several steps that are performed at a number of different stations. In FIG. 1, five stations are represented, but the number of stations may be either less or more than five. This will be apparent from the description below of the method that is performed step by step and divided into the different station represented by the letters (A)-(E). A preferred embodiment of the manufactured tray and the device will be described in more detail following a description of the method of manufacture.

(A) At the first station (A), which mainly comprises a suspension mould 1 and a male mould 2, in a first step a suspension of fibre material of cellulose is added to the opening 10 of the suspension mould 1. The suspension is divided evenly in the suspension mould thanks to its opening 10 being provided with small holes 11, which are evenly distributed over the entire surface of the opening and in which a suction may be created. The size of the holes is adapted in order to let water flow through the holes, while the cellulose fibres are prevented from passing through. As the fibres gather at the openings of the holes the suction decreases, and the suction will amount to zero over the entire surface once an even amount of cellulose fibres has been spread over the whole suspension mould.

Once the suspension is evenly spread, a male mould 2 is pressed down against the suspension mould 1 such that a suspension space (not shown) becomes delimited between the suspension mould 1 and the male mould 2, in which the suspension is enclosed. The male mould 2 is provided with a heating unit 22 and preferably the temperature of the male mould is approximately 200° C. when it is lowered towards the suspension mould 1. Once the male mould has reached its position close to the suspension mould 1, water and water vapour are drained off from the suspension in the suspension space. The suction is formed by coupling a suction source to an outlet pipe 14 at one side of the suspension mould. For the best drying effect to occur, it has appeared to be efficient to blow air from the male mould 2 at the same time, which is performed by coupling an inlet pipe 23 at the male mould 2 to a blow source, and blow in air through pores 21 of the male mould 2. The drying is continued until the suspension has been dried to a continuous paste.

Subsequently, the continuous paste is transferred to the next station. This is done by adhering it to the male mould 2 through suction at the same time as fluid, preferably air, is being blown from the suspension mould 1. Thus, at this stage the outlet pipe 24 at the male mould 2 is coupled to a suction source, at the same time as an inlet pipe 13 at the suspension mould is coupled to a blow source. Thereby, the continuous paste adheres to the male mould 2 by suction and may be transferred by means of this one along a transport track 7 to the second station (B).

(B) At the second station, a compression mould 3 is waiting, and the recently formed continuous paste becomes enclosed in a mould space (not shown) that is delimited between the compression mould 3 and the male mould 2. Like the suspension mould 1, the compression mould 3 is provided with an inlet 33 and an outlet 34 for leading in and draining off of fluid. The compression mould 3 further comprises a heating unit 32. At the second station (B), the continuous paste is being dried to a finished tray. This is achieved by adding heat from the heating unit 22 of the male mould 2 and the heating unit 32 of the compression mould 3 to the mould space for heating up the continuous paste, at the same time as the water vapour formed is being drained off from the mould space until a tray having a desired dry matter content is obtained. Preferably, water vapour is drained off from the mould space through both the male mould 2 and the compression mould 3, whereby an underpressure is formed in the mould space. This is possible since both the compression mould 3 and the male mould 2 are provided with separate inlet and outlet pipes, respectively, and the flow is controlled by regulation of valves in a manner otherwise known to a person skilled in the art. Thereby, it is also possible to lead in fluid that is free from impurities to the mould space via any of the inlet pipes 24, 34 since fluid from the mould space is lead away via the outlet pipe 23, 33 without contaminating the inlet pipe 24, 34.

(C) Under certain circumstances, from the perspective of time optimisation, it is of interest to let the tray dry in an additional step. In that case, the compression moulding is performed in two stages in two different compression moulds 3 and 4, respectively, wherein the continuous paste is first being dried to a first dry matter content in the first compression mould 3 and is subsequently being transferred to the second compression mould 4, in which the continuous paste is being dried to a tray having a desired dry matter content. This division is made because the suspension step at the first station (A) is performed faster than the compression moulding step (B) and because at "an assembly production line", the slowest process step sets the overall speed. By dividing the compression moulding step (B) in two shorter compression moulding steps (B and C), no waiting time will arise at the suspension step (A). The second compression moulding step (C) is identical to the first compression moulding step (B).

(D) The method of manufacture may possibly be supplemented by the step of coating the inside of the obtained tray with a protective film 9. At the film coating station (D), the protective film 9 is first heated up by means of a heating unit 72 to a temperature at which it softens, after which the protective film is lowered to the tray and is adhered to by means of a suction applied right through the tray and the hollow mould 73 in which the tray is being kept at this stage. Subsequently, a cutting tool 8 is lowered that cuts the protective film 9 and preferably a part of the tray 6 such that an even edge is obtained. The protective film preferably consists of a biodegradable material or plastic, such as for example PET.

(E) Following these steps, a finished tray 6 i delivered at the last station (E), which tray is ready to use for storage of suitable products, preferably food, and not least food that is meant to be heated in a microwave oven or a conventional oven.

An embodiment of the obtained tray is shown in more detail in FIGS. 2-3. In FIG. 2, the tray 6 is shown from above, from which it is seen that the tray has a bottom end 61 and four sides 62. Further, the tray has a frame 63 that is practical for the handling of the tray and that moreover gives additional stability to the construction. In FIG. 3, that shows a cross-section along the cut III in FIG. 2, it is seen that the protective film 9 covers the whole fibre tray and that the frame of the tray ends with a sharp edge 64.

As shown in FIG. 1, the device comprises several stations A-D. However, the invention relates foremost to the stations B and C, at which the very compression moulding takes place.

As described above, from the perspective of time optimisation it may be advantageous to have two compression moulding stations. However it is quite sufficient having only one compression moulding station.

In the following, an embodiment of the device according to the invention will be described by reference to the FIGS. 4a, 4b and 5.

The device comprises a female mould or compression mould 3 having an essentially flat bottom end 36 and essentially flat surrounding sides 37 for compression moulding and drying of cellulose pulp to a finished tray. The device further comprises a male mould 2, which is arranged to fit into the compression mould 3 and consequently comprises a bottom space 26 and lateral surfaces 27 corresponding to the compression mould, wherein the compression mould 3 and the male mould 2 between themselves delimit a mould space 30 comprising a base section 30a and a side section 30b for compression moulding of the cellulose pulp. The compression mould 3 and the male mould 2 are provided with blow and suction devices for blowing in and suction of fluid in and out of the mould space 30. The blow and suction devices each comprises an inlet pipe 23, 33 having an inlet valve (not shown) and an outlet pipe 24, 34 having an outlet valve (not shown). The inlet pipes 23, 33 are each coupled to an inlet chamber 28 and 38, respectively, and the outlet pipes 24, 34 are each coupled to an outlet chamber 29 and 39, respectively. Further, the inlet chamber 28 of the male mould 2 and the outlet chamber 29 of the male mould 2 are arranged to be in fluid connection with the upper side of the mould space 30, while the inlet chamber 38 of the compression mould 3 and the outlet chamber 39 of the compression mould 3 are arranged to be in fluid connection with the underside of the mould space 30.

An advantage of the device according to the invention is that the inlet pipes 23, 33 are separated from the outlet pipes 24, 34, whereby fluid that is free from impurities is arranged to be lead into the mould via the inlet pipes 23, 33 and the inlet chambers 28, 38, and whereby fluid from the mould space 30 is arranged to be lead away via the outlet chambers 29, 39 and the outlet pipes 24, 34 without contaminating the inlet pipes 23, 33. In previously known devices, it has been common to let the inflow and the outflow occur through the same pipe, whereby parts of the suspension that has been drained off will be reintroduced into the mould space when air is blown in again, e.g. when the tray is to be removed from the mould. Another problem has been that the inflow and the outflow have occurred through a separate plate at which several compression moulds have been arranged. This has made it difficult to achieve a tight seal between the moulds and said plate. This has resulted in bending of the plate when air has been blown into the moulds, which has influenced the precision of the mould spaces negatively. By incorporating the inflow and the outflow of the device according to the invention into the moulds themselves, these problems are eliminated.

Further, the compression mould is provided with a porous flowthrough section 40, which is arranged between the mould space 30, the inlet chamber 38 and the outlet chamber 39 in order to let fluid through from the inlet chamber 38 to the mould space 30 and in order to let fluid through from the mould space 30 to the outlet chamber 39. The flowthrough section 40 is arranged such that one of its sides constitutes a part of the inside surface of the compression mould.

The porous flowthrough section 40 may possibly be divided into an inlet section and an outlet section separated therefrom, whereby fluid that flows into the mould space 30 from the inlet chamber 38 passes through the inlet section and fluid that flows out of the mould space 30 to the outlet chamber 39 passes through the outlet section. However, in the embodiment shown, the inlet chamber 38 and the outlet chamber 39 are arranged in fluid connection with each ither, wherein both the inflow to the mould space 30 and the outflow from the mould space 30 occur through a continuous porous flowthrough section 40.

The size of the flowthrough section 40 is of course possible to influence. In the extreme case, the flowthrough section constitutes the entire inner surface of the compression mould. However, in the embodiment shown, the flowthrough section 40 constitutes only a part of the bottom end of the mould. At the center of the flowthrough section 40, a stamp 41 is arranged that is intended to cause an imprint on the tray formed.

Like the compression mould 3, the male mould 2 comprises a porous flowthrough section 50, which is arranged between the mould space 30, the inlet chamber 28 and the outlet chamber 29 in order to let through fluid from the inlet chamber 28 to the mould space and in order to let through fluid from the mould space 30 to the outlet chamber 29, wherein one side of the flowthrough section 50 constitutes a part of the inside surface of the male mould 2.

However, a difference compared to the compression mould (the female mould) is that the male mould 2 is provided with slits 51 that connect an upper edge section 30c of the mould space 30, which corresponds to the frame 63 of the tray 6, with the inlet chamber 28 and the outlet chamber 29 for blowing in and suction of fluid to and from the side sections 30b of the mould space 30. As the flowthrough section 50 in the embodiment shown only stretches along the base section 30a of the mould space 30, the exchange of fluid at the side sections 30b of the mould space 30 is of course improved by the existence of the slits 51.

Further, both the male mould 2 and the compression mould 3 are provided with a heating unit 22, 32 each, for heat transfer to the mould space. The temperature of the moulds is approximately 200° C. during the compression moulding. The exact temperature depends on the depth of the tray and how fast the tray should dry. The deeper the tray is and the faster the tray should dry, the higher should the temperature of the trays be. Thereby, the water present in the tray paste is vaporised and since at the same time suction is applied from both the male mould 2 and the compression mould 3, the water vapour is drained off efficiently such that the tray dries relatively fast.

The porous flowthrough sections 40, 50 are suitably composed of sintered metallic or ceramic parts. It is of course important that the material is corrosion-proof as it is to function in relatively warm and moist environments. In the embodiment shown, the flowthrough section is made of sintered bronze having a pore size of the magnitude 50-200 μm. However, the size of the pores may vary. They must of course be small enough not to let the cellulose fibres pass through. On the other hand, the drying of the tray occurs faster the bigger the pores are. Moreover, the pore size influences the surface of the finished tray; the smaller the pores, the smoother is the surface. When the tray is to be coated with a protective film however, a too smooth surface is not desired since the protective film, besides adhering to the material, also binds mechanically to irregularities of the surface of the tray. Therefore, a suitable pore size is tried out depending on if a protective film is to be applied to the tray and in that case of which material the protective film should consist. When a protective film of PET is applied to the tray, it has been shown that such a film adheres well to a tray that has been manufactured in a mould having a flowthrough section with a pore size of about 80 μm.

In FIG. 5, a cross-section of the compression mould is shown. From the figure it is apparent that the inflow 33 occurs from one side of the mould and the outflow 34 occurs from the other side. The inlet chamber and the outlet chamber further comprise distribution channels 42 that stretch perpendicular to the inlet pipe and the outlet pipe for an improved exchange of fluid with the flowthrough section 40. In the figure, the stamp 41 is also shown and a number of screw holes 43 to fix the mould to a plate 44 (see FIG. 4a). For an increased capacity, several moulds are usually arranged next to each other at the same plate 44, and consequently several male moulds are arranged next to each other at a corresponding plate 54 (see FIG. 4a).

A specific embodiment has been described above. To a person skilled in the art it is however obvious that the device may be designed in a large number of ways without departing from the inventive thought. The invention is thus only limited by the enclosed claims.

The invention claimed is:

1. A device for the manufacture of a tray (6) of cellulose material, which comprises:
    a compression mould (3) comprising an essentially flat bottom end (36) and surrounding sides (37) for compression moulding and drying of cellulose pulp to a finished tray; and
    a male mould (2) that is arranged to fit into the compression mould (3) and that comprises a bottom space (26) and lateral surfaces (27) corresponding to the compression mould (3),
    wherein the compression mould (3) and the male mould (2) between themselves delimit a mould space (30) comprising a base section (30a) and a side section (30b) for compression moulding of the cellulose pulp,
    wherein both the compression mould (3) and the male mould (2) are provided with blow and suction devices for blowing in and suction of fluid in and out of the mould space (30),
    wherein the blow and suction devices of both the compression mould (3) and of the male mould (2) comprise an inlet pipe (23, 33) having an inlet valve, which is coupled to an inlet chamber (28, 38) in connection with the mould space (30) and an outlet pipe (24, 34) having an outlet valve, which is separated from the inlet pipe (23, 33) and coupled to an outlet chamber (29, 39) in connection with the mould space (30), whereby fluid that is free from impurities is arranged to be lead into the mould via the respective inlet pipes (23, 33) and the inlet chambers (28, 38), and whereby the fluid from the mould space (30) is arranged to be lead away via the outlet chambers (29, 39) and the outlet pipes (24, 34) without contaminating the respective inlet pipe (23, 33), and
    wherein the male mould (2) is provided with slits (51) that connect an upper edge section (30c) of the mould space (30) with the inlet chamber (28) and the outlet chamber (29) of the male mould (2) for blowing in and suction of fluid to and from the mould space (30).

2. The device according to claim 1, wherein the compression mould (3) comprises a porous flowthrough section (40), which is arranged between the mould space (30), the inlet chamber (38) and the outlet chamber (39) in order to let fluid through from the inlet chamber (38) to the mould space (30) and in order to let fluid through from the mould space (30) to the outlet chamber (39), wherein one side of the flowthrough section (40) constitutes a part of the inside surface of the compression mould (3).

3. The device according to claim 1, wherein the male mould (2) comprises a porous flowthrough section (50), which is arranged between the mould space (30), the inlet chamber (28) and the outlet chamber (29) in order to let fluid through from the inlet chamber (28) to the mould space (30) and in order to let fluid through from the mould space (30) to the outlet chamber (29), wherein one side of the flowthrough section (50) constitutes a part of the inside surface of the male mould (2).

4. The device according to claim 2, wherein the porous flowthrough section (40, 50) is divided into an inlet section and an outlet section separated therefrom, whereby fluid that flows into the mould space (30) from the inlet chamber (28, 38) passes through the inlet section and fluid that flows out of the mould space (30) to the outlet chamber (29, 39) passes through the outlet section.

5. The device according to claim 2, wherein the inlet chamber (28, 38) and the outlet chamber (29, 39) are arranged to be in fluid connection with each other, wherein both the inflow to the mould space (30) and the outflow from the mould space (30) occur through the porous flowthrough section (40, 50).

6. The device according to claim 2, wherein the porous flowthrough section (40, 50) is composed of sintered metallic or ceramic parts having a pore size of about 50-100 μm.

7. The device according to claim 2, wherein the male mould (2) and the compression mould (3) are provided with a heating unit (22, 32) each for heat transfer to the mould space (30).

8. The device according to claim 2, wherein the male mould (2) comprises a porous flowthrough section (50), which is arranged between the mould space (30), the inlet chamber (28) and the outlet chamber (29) in order to let fluid through from the inlet chamber (28) to the mould space (30) and in order to let fluid through from the mould space (30) to the outlet chamber (29), wherein one side of the flowthrough section (50) constitutes a part of the inside surface of the male mould (2).

9. The device according to claim 3, wherein the porous flowthrough section (40, 50) is divided into an inlet section and an outlet section separated therefrom, whereby fluid that flows into the mould space (30) from the inlet chamber (28, 38) passes through the inlet section and fluid that flows out of the mould space (30) to the outlet chamber (29, 39) passes through the outlet section.

10. The device according to claim 3, wherein the inlet chamber (28, 38) and the outlet chamber (29, 39) are arranged to be in fluid connection with each other, wherein both the inflow to the mould space (30) and the outflow from the mould space (30) occur through the porous flowthrough section (40, 50).

* * * * *

UNITED STATES PATENT AND TRADEMARK OFFICE
CERTIFICATE OF CORRECTION

PATENT NO.       : 8,647,093 B2                                                Page 1 of 1
APPLICATION NO. : 12/918207
DATED            : February 11, 2014
INVENTOR(S)      : Joakim Stockhaus It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Twenty-ninth Day of September, 2015

Michelle K. Lee
*Director of the United States Patent and Trademark Office*